Patented Sept. 29, 1953

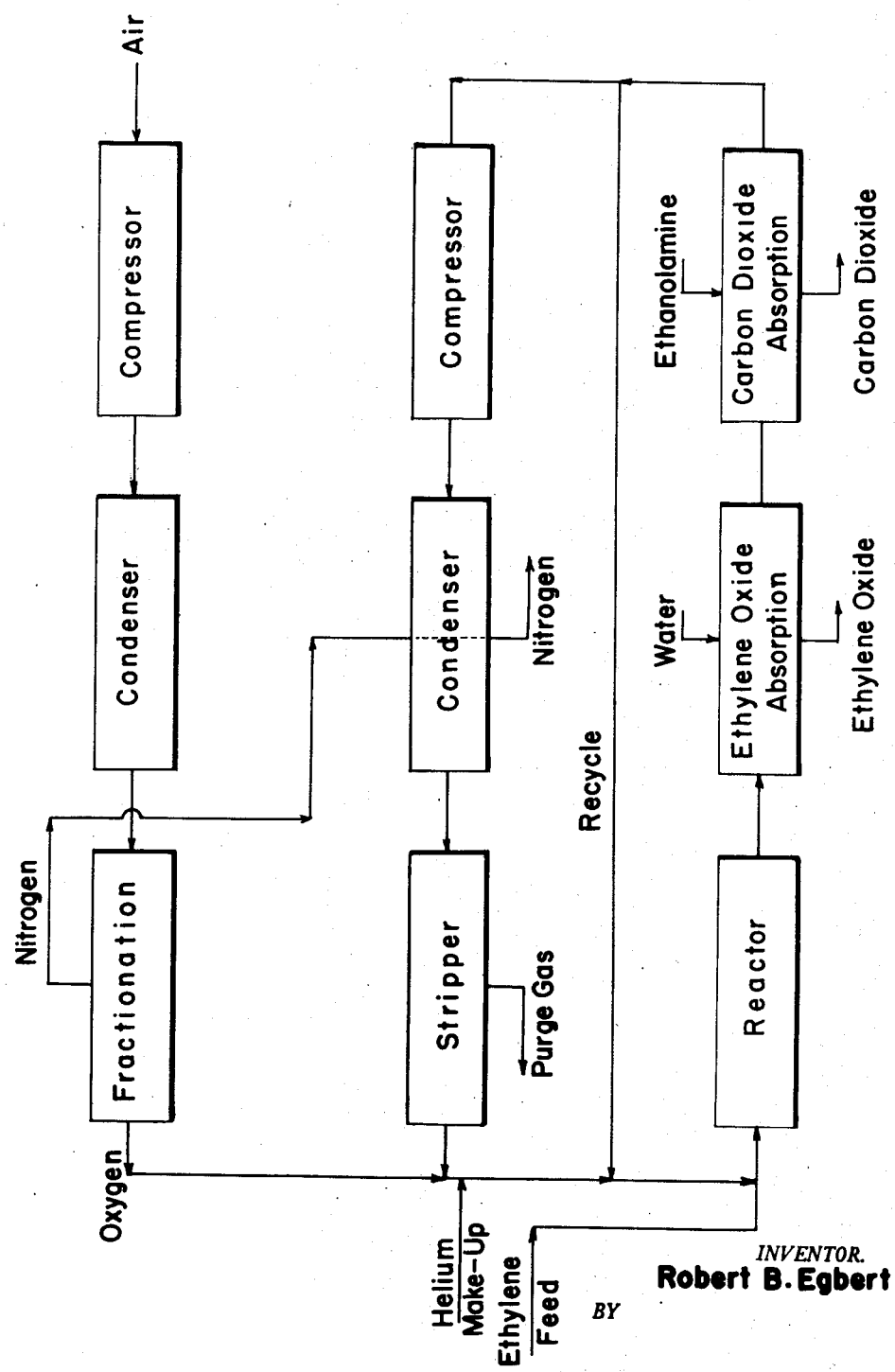

2,653,952

UNITED STATES PATENT OFFICE 2,653,952

PROCESS FOR THE MANUFACTURE OF ETHYLENE OXIDE

Robert B. Egbert, Roslyn Heights, N. Y., assignor to Chempatents, Inc., New York, N. Y., a corporation of Delaware Application May 25, 1950, Serial No. 164,130

10 Claims. (Cl. 260—348.5)

This invention relates to a process for the oxidation of ethylene to form ethylene oxide and more particularly to a process in which the reacting gases are diluted with helium.

In the catalytic oxidation of ethylene to form ethylene oxide an inert gas is added to a mixture of ethylene and oxygen to reduce the concentration of ethylene in the mixture to the neighborhood of 5%, a concentration corresponding to maximum selectivities. For most efficient oxidation of ethylene, it is desirable to separate the ethylene oxide after each pass over the catalyst and recycle the unoxidized gaseous mixture, some of the ethylene being oxidized in each pass over the catalyst. The inert gas ordinarily used is nitrogen because of its availability in the air generally used as a source of oxygen for the reaction. In the recycling operation, the nitrogen, not taking part in the reaction, tends to build up to high concentrations, and it is necessary to purge considerable gas from the system continually to maintain the proper composition of reactants in the feed gas. Since the spent gas from the reactor always contains some unoxidized ethylene, the purging of large quantities of nitrogen from the system will cause losses of important quantities of ethylene.

It is an object of this invention to reduce the loss of ethylene in the gases purged from an ethylene oxidation process and thereby increase the yield of ethylene oxide.

Another object of this invention is to improve the control of the temperature of the oxidation reaction by improving the transfer of the heat of reaction to a cooling medium.

A further object of this invention is to reduce the pressure drop through the reactor and thereby reduce the power required for the process.

It is also an object of this invention to reduce the quantities of catalyst required by increasing the ethylene oxide production per unit volume of catalyst.

With these and other objects in view, this invention resides in the introduction of helium as a diluent into a gaseous reaction mixture containing ethylene and oxygen.

The single figure of the drawing is a flow sheet diagrammatically illustrating the process of this invention.

Referring to the flow sheet, ethylene is introduced into the reactor from any suitable feed gas containing ethylene. The feed gas may, for example, be from a hydrocarbon cracking process or other source. Sufficient oxygen is added to the feed gas prior to its introduction into the reactor to provide the proper ratio of ethylene to oxygen for efficient operation of the process. Ordinarily, the reactor will be a vessel containing a plurality of relatively long, slender tubes filled with a metallic silver catalyst. As an example of suitable operation conditions, the feed gas introduced into the reactor may contain approximately 5% ethylene and 6% oxygen and the remainder substantially inert gas, principally helium, nitrogen and carbon dioxide, the temperature in the reactor may range from about 220 to 350° C. and the pressure range from about 1 to 20 atmospheres. Ordinarily, about 25-40% of the ethylene in the feed is converted in each pass through the reactor.

The products from the reactor, consisting essentially of ethylene oxide, ethylene, oxygen, nitrogen, helium and carbon dioxide, are delivered to an ethylene oxide absorber in which the reaction products are passed in contact with a suitable solvent, usually water, which dissolves the ethylene oxide formed in the reactor and thereby separates it from the gaseous mixture. Obviously, other solvents may be used in place of water for the absorption of ethylene oxide.

Following the ethylene oxide absorption, the spent gases are passed in contact with a solvent for carbon dioxide in a carbon dioxide absorption step. Ordinarily ethanolamine will be used as a solvent, but here again other suitable solvents are available.

The gas discharged from the carbon dioxide absorber contains important quantities of ethylene and is recycled through the recycle line to be again passed in contact with the catalyst in the reactor.

According to this invention, helium is used as the inert gas diluting the reaction mixture to a safe and efficient range of ethylene and oxygen concentrations, and, hence, it is necessary to supply the oxygen required for the reaction in a relatively nitrogen-free form. For this purpose, an air fractionation process, indicated diagrammatically in the drawing as consisting of a compression, condensing and fractionation step is employed. The oxygen obtained from the fractionation is substantially pure, above 90% oxygen, and is added to the recycle gases as they return for an additional pass through the reactor. The nitrogen obtained in the air fractionation step may be discharged to the atmosphere or used for any other purpose economically feasible in the particular installation. In a preferred embodiment of the present invention, the nitrogen from the fractionation step is used as a cooling medium in the manner hereinafter described.

Some nitrogen and other inert gases will be introduced into the reaction mixture with the ethylene feed gas and the oxygen, and it will be necessary to eliminate these gases from the system to maintain the proper concentrations of reacting gases in the reactor. This is accomplished by withdrawing a portion of the recycle gas stream and purging it from the system. The helium could, of course, be purged with the other gases, but since helium is relatively expensive, it is desirable to recover it from the purged gases and return it to the system. Again referring to the drawing, the purging is accomplished without substantial loss of helium by passing the purge gases through a compressor and then a condenser in which they are cooled by nitrogen from the air fractionation step. The condensed purge gases are then passed through a stripper in which the helium is recovered from the other gases and returned to the system. The purged gases separated from the helium in the stripper may be exhausted to the atmosphere or otherwise disposed of. In some instances, it may be desirable to pass both the nitrogen from the air fractionation step and the purged gases through a power recovery step before they are removed from the system. Some small amounts of helium may be dissolved in the solvents used to absorb the ethylene oxide and carbon dioxide. This helium may be stripped from the solvents and returned to the system, making it necessary to add only very small amounts of helium to the system to replace the losses.

An important advantage of the process of this invention is the increase in the production of ethylene oxide per unit volume of catalyst. A comparison of the results of this invention with a conventional process employing nitrogen as the inert gas is set forth in Table I.

*Table I*

|  | Normal | Helium system |
| --- | --- | --- |
| Tube Diameter | 1.0″ I. D. | 1.0″ I. D. |
| Catalyst depth | 16 ft. | 8 ft. |
| Pressure | 10 atm. | 10 atm. |
| Gas Flow (NTP) | 700 cu. ft./hr. | 1,000 cu. ft./hr. |
| Gas Inlet Composition: |  |  |
| $C_2H_4$ | 5% | 5%. |
| $CO_2$ | 8% | 2%. |
| $O_2$ | 6% | 6%. |
| $N_2$ | 81% | 27%. |
| He | 0 | 60%. |
| Conversion | 37% | 38%. |
| Yield | 24% | 25%. |
| Selectivity | 65% | 66%. |
| Prod. Ratio (gms. oxide)/liter catalyst | 178 | 530. |

It will be noted that without substantial change in the conversion and yield of ethylene oxide, the production of ethylene oxide per unit volume of catalyst is increased approximately three-fold.

Another important advantage resulting from this invention is the reduction in the amount of ethylene discharged with the purged gases. Any ethylene accompanying the helium will, of course, be returned to the system since the helium is merely recycled. The amount of nitrogen that enters the system with the oxygen from the fractionation process is far below that entering the system in the conventional processes using air directly as a source of nitrogen, and, consequently, the amount of nitrogen purged from the system is drastically reduced. Clearly, the reduction in the amount of gas purged from the system will reduce the amount of ethylene entrained with those gases and cause important savings in ethylene. Actually, the savings in ethylene resulting from the use of helium as an inert gas are generally sufficient to pay for the air fractionation step.

The present invention also allows improved control of the operation conditions in the reactor. The use of helium as an inert gas increases the rate of heat transfer between the reacting gases and the tubes of the reactor and allows more accurate control of the temperature of reaction. This advantage is particularly great when sodium is used as a heat transfer medium on the shell side of the tubes of the reactor in the manner described in my co-pending application Serial No. 239,453, filed July 31, 1951, entitled Heat Transfer System. Moreover, the desired turbulent flow of the reaction gases through the tubes of the reactor may be obtained with a low pressure drop, thereby effecting important savings in power consumption.

While this invention has been described in detail with respect to a particular modification of the invention, it is to be understood that the concept of this invention is not limited to those details, but is determined by the scope of the appended claims.

I claim:

1. In the oxidation of ethylene to ethylene oxide by passing a stream of a gaseous mixture containing ethylene and oxygen over a catalyst having an active silver surface at a temperature ranging from about 220° C. to 350° C. to oxidize the ethylene to ethylene oxide, the improvement comprising adding helium to the ethylene-containing gaseous mixture in quantities to give a concentration of ethylene and oxygen suitable for the oxidation reaction.

2. In a process for the oxidation of ethylene by passing a gaseous feed mixture containing ethylene and oxygen over a catalyst having an active silver surface at a temperature of about 220 to 350° C. to form ethylene oxide, the steps of adding helium to the ethylene-containing feed mixture prior to the passage of the mixture over the catalyst separating the helium from the lean gas from the reaction, and recycling the helium to the feed mixture.

3. A process for the preparation of ethylene oxide by the catalytic oxidation of ethylene comprising passing a gaseous mixture consisting essentially of ethylene, oxygen and helium over a catalyst having an active silver surface at a temperature of 220° C. to 350° C. to form ethylene oxide, absorbing the ethylene oxide in a solvent to strip it from the lean gas from the catalyst, recycling the stripped lean gas to the catalyst, and withdrawing a portion of the stripped gas from the system to purge the system of inerts.

4. A process for the preparation of ethylene oxide by the catalytic oxidation of ethylene comprising passing a gaseous reaction mixture containing ethylene, oxygen and helium at a temperature of about 220 to 350° C. over a catalyst having an active silver surface to form ethylene oxide, separating the ethylene oxide from the lean gas leaving the catalyst, recycling the thus stripped lean gas to the catalyst, adding ethylene, helium and substantially pure oxygen to the recycled lean gas prior to passing it over the catalyst to form the gaseous reaction mixture, and purging a portion of the stripped lean gas from the system to maintain the desired composition of gases in the process.

5. A process for the preparation of ethylene oxide by the catalytic oxidation of ethylene comprising passing a gaseous reaction mixture containing ethylene, oxygen and helium over a catalyst having an active silver surface at a temperature of 220° C. to 350° C. to form ethylene oxide, separating the ethylene oxide from the lean gas leaving the catalyst, recycling the thus stripped lean gas to the catalyst, adding ethylene, helium and substantially pure oxygen to the recycled lean gas prior to passing it over the catalyst to form the gaseous reaction mixture, withdrawing a portion of the stripped lean gas from the recycle stream, recovering the helium from the withdrawn portion, returning the recovered helium to the recycling lean gas, and discharging the remainder of the withdrawn portion from the system.

6. A process for the preparation of ethylene oxide by the catalytic oxidation of ethylene comprising passing a gaseous reaction mixture containing ethylene, oxygen and helium over a catalyst having an active silver surface at a temperature of 220 to 350° C. to form ethylene oxide, separating the ethylene oxide from the lean gas leaving the catalyst, separating carbon dioxide from the lean gas, recycling the thus stripped lean gas to the catalyst, adding ethylene, helium and substantially pure oxygen to the recycled lean gas prior to passing it over the catalyst to form the gaseous reaction mixture, and purging a portion of the stripped lean gas from the system to maintain the desired composition of gases in the process.

7. A process for the preparation of olefin oxide by the catalytic oxidation to olefin comprising passing a gaseous reaction mixture containing olefin, oxygen and helium over a catalyst having an active silver surface at a temperature of 220° C. to 350° C. to form olefin oxide, separating the olefin oxide from the lean gas leaving the catalyst, recycling the thus stripped lean gas to the catalyst, adding olefin, helium and substantially pure oxygen to the recycled lean gas prior to passing it over the catalyst to form the gaseous reaction mixture, and purging a portion of the stripped lean gas from the system to eliminate inert gases from the process.

8. A process for the oxidation of ethylene to form ethylene oxide comprising passing a gaseous feed mixture containing about 5% ethylene and 6% oxygen over a silver catalyst at a temperature ranging from 220° C. to 350° C. to form ethylene oxide, absorbing the ethylene oxide formed to separate it from the lean gas from the catalyst, recycling the thus stripped lean gas through the system, and adding oxygen in a substantially pure form, ethylene and helium to the recycled gas prior to passing over the catalyst to maintain a feed mixture of the desired composition.

9. A process for the oxidation of ethylene to form ethylene oxide comprising passing a gaseous feed mixture containing about 5% ethylene and 6% oxygen over a silver catalyst at a temperature ranging from 220° C. to 350° C. to form ethylene oxide, absorbing the ethylene oxide formed to separate it from the lean gas from the catalyst, recycling the thus stripped lean gas through the system, adding oxygen in a substantially pure form, ethylene and helium to the recycled gas prior to passing over the catalyst to maintain a feed mixture of the desired composition, withdrawing a portion of the recycle gas from the system to prevent the building up of inerts, and separating the helium from the other gases in the withdrawn portion and returning the helium to the system.

10. A process for the oxidation of ethylene comprising passing a mixture of ethylene, oxygen and an inert gas over a silver catalyst at a temperature of approximately 220° C. to 350° C. and a pressure up to about 20 atmospheres, said inert gas being principally helium.

ROBERT B. EGBERT.

References Cited in the file of this patent

FOREIGN PATENTS

| Number | Country | Date |
|--------|---------|------|
| 531,256 | Great Britain | 1941 |

OTHER REFERENCES

Handbook of Chemistry and Physics, 27 ed., p. 1708.